(12) United States Patent
Hiraguchi

(10) Patent No.: US 6,983,908 B2
(45) Date of Patent: Jan. 10, 2006

(54) RECORDING TAPE CARTRIDGE

(75) Inventor: Kazuo Hiraguchi, Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 10/671,782

(22) Filed: Sep. 29, 2003

(65) Prior Publication Data

US 2004/0061015 A1 Apr. 1, 2004

(30) Foreign Application Priority Data

Sep. 30, 2002 (JP) .............................. 2002-286889

(51) Int. Cl.
*G11B 23/107* (2006.01)
(52) U.S. Cl. ..................... 242/348; 360/132
(58) Field of Classification Search ................ 242/338, 242/338.1, 348, 348.2, 343, 343.1, 343.2, 242/609, 613, 613.4, 345.2; 360/132
See application file for complete search history.

(56) References Cited

U.S. PATENT DOCUMENTS

| | | | |
|---|---|---|---|
| 3,857,531 A * | 12/1974 | Janizen | 242/348 |
| 4,723,731 A * | 2/1988 | Posso | 242/338.1 |
| 5,893,527 A * | 4/1999 | Mizutani et al. | 242/348 |
| 6,113,020 A * | 9/2000 | Nayak | 242/348 |
| 6,154,342 A * | 11/2000 | Vanderheyden et al. | 360/132 |
| 6,318,659 B1 | 11/2001 | Zwettler et al. | |
| 6,667,852 B2 * | 12/2003 | Morita et al. | 360/132 |
| 6,736,344 B2 * | 5/2004 | Tsuyuki et al. | 242/338.1 |
| 6,745,968 B1 * | 6/2004 | Schoettle et al. | 242/338.1 |
| 6,751,059 B2 * | 6/2004 | Morita et al. | 360/132 |
| 2001/0028010 A1 * | 10/2001 | Tsuyuki et al. | 242/338.1 |

FOREIGN PATENT DOCUMENTS

| | | |
|---|---|---|
| JP | 3187022 | 5/2001 |
| JP | 2002-343058 | 11/2002 |

\* cited by examiner

*Primary Examiner*—William A. Rivera
(74) *Attorney, Agent, or Firm*—Sughrue Mion, PLLC

(57) ABSTRACT

A recording tape cartridge in which it is possible to suppress radial direction movement of a reel by a braking member which impedes rotation of the reel at a time when the recording tape cartridge is not being used, while ensuring strength of a reel hub with respect to pressure of winding of a recording tape therearound. At the recording tape cartridge, the reel, around which a magnetic tape is wound and which is accommodated in a case, is set in a rotation locked state when a braking member, which cannot rotate due to the braking member engaging with a cross-shaped rib, engages with anchor projections. When the braking member moves apart from the anchor projections, a meshed state is cancelled, and the reel can rotate with respect to the case. A reinforcing ring, which is fit together with an inner peripheral surface of the reel hub, reinforces the reel hub whose top end is open. A restricting ring portion of the reinforcing ring opposes an outer peripheral surface of the braking member, and restricts radial direction movement of the reel.

15 Claims, 12 Drawing Sheets

RECORDING TAPE CARTRIDGE

CROSS-REFERENCE TO RELATED APPLICATION

This application claims priority under 35 USC 119 from Japanese Patent Application No. 2002-286889, the disclosure of which is incorporated by reference herein.

BACKGROUND OF THE INVENTION

1. Field of the Invention

The present invention relates to a recording tape cartridge which rotatably accommodates a reel on which a recording tape, such as a magnetic tape or the like, is wound.

2. Description of the Related Art

Recording tapes, such as magnetic tapes and the like, are used as external recording media of computers and the like. Little space is required for storage of the recording tape, and a large amount of information can be recorded thereon. A so-called single-reel recording tape cartridge is used which rotatably accommodates, within a case, a single reel on which such a recording tape is wound.

Such a recording tape cartridge has a braking means so that the reel does not rotate within the case when the recording tape cartridge is not being used (see, for example, Japanese Patent No. 3187022). A recording tape cartridge equipped with this braking means will be described hereinafter on the basis of FIGS. 11 and 12.

In a recording tape cartridge 200 shown in FIG. 11, a single reel 204 is accommodated within a case 202. The case 202 has a gear opening 206 which is formed at the central portion of a floor plate 202A of the case 202, and a rotation restricting rib 208 which projects downward from a ceiling plate 202B of the case 202.

The reel 204 has a reel hub 210 which is formed in the shape of a cylinder having a floor, and on whose outer peripheral portion a recording tape is wound. A lower flange 204A extends outwardly in the radial direction, integrally from a vicinity of the bottom end of the reel hub 210. On the other hand, an upper flange 204B is fixed to the top end portion of the reel hub 210 by welding or the like.

A reel gear 214, which can mesh with a driving gear 212A formed at a rotating shaft 212 of a drive device, is formed in an annular form at the bottom surface of a floor portion 210A of the reel hub 210. Through holes 216, which pass through the floor portion 210A, are provided at a plurality of places which are evenly spaced on a circumference at the region where the reel gear 214 is formed. The diameter of each through hole 216 is greater than the gear pitch of the reel gear 214. Teeth of the reel gear 214 are not provided around each through hole 216.

Anchor projections 218 stand erect at the top surface of the floor portion 210A of the reel hub 210, at plural positions (discretely) between the through holes 216 which are disposed along a predetermined circumference. A gear tooth 218A is formed at the top end portion of each anchor projection 218.

A disc-shaped braking member 220 is inserted in the reel hub 210. A braking gear 220A, which is annular and which can mesh with the gear teeth 218A, is provided at the bottom surface of the braking member 220. A projection 222 stands erect at the top surface of the braking member 220. An insertion groove 222A, in which the rotation restricting rib 208 of the case 202 is inserted, is provided at the projection 222. Due to the rotation restricting rib 208 being inserted in the insertion groove 222A, the braking member 220 cannot rotate with respect to the case 202. Further, the braking member 220 can move in the vertical directions while being guided by the rotation restricting rib 208.

A compression coil spring 224 is disposed between the ceiling plate 202B of the case 202 and the braking member 220. Usually, the braking member 220 is urged downward by the urging force of the compression coil spring 224, such that the braking gear 220A meshes with the gear teeth 218A. In this way, there is usually a rotation locked state in which rotation of the reel 204 with respect to the case 202 is impeded. Further, the reel gear 214 is exposed from the gear opening 206 while the reel 204 is pushed against the floor plate 202A of the case 202 by this urging force.

Moreover, a releasing member 226 is disposed between the floor portion 210A of the reel hub 210 and the braking member 220, so as to abut both. The releasing member 226 has leg portions 226A which are formed in the shape of plates which do not interfere with the anchor projections 218, and which enter into the respective through holes 216.

Due to the driving gear 212A meshing with the reel gear 214, as shown in FIG. 12, the leg portions 226A are pushed by the driving gear 212A against the urging force of the compression coil spring 224, and the releasing member 226 is pushed upward. When the braking member 220 is pushed upward while the releasing member 226 moves away from the floor portion 210A, the meshing of the braking gear 220A and the gear teeth 218A is released. At this time, the reel 204 also floats up from the floor plate 202A, and the reel 204 becomes able to rotate within the case 202.

When the rotating shaft 212 rotates, the reel 204, whose reel gear 214 is meshing with the driving gear 212A of the rotating shaft 212, rotates within the case 202. At this time, the releasing member 226 rotates together with the reel 204, and the axially central portion of the releasing member 226 slidingly contacts the axially central portion of the braking member 220. Thus, the axially central portion of the braking member 220 is a convex portion 220B which is formed in the shape of a substantially spherical surface, and substantially point-contacts the axially central portion of the releasing member 226.

On the other hand, when the meshed state of the driving gear 212A and the reel gear 214 is released, due to the urging force of the compression coil spring 224, the braking member 220 moves downward, the braking gear 220A and the gear teeth 218A mesh together, and the reel 204 is pushed against the floor plate 202A. In this way, the reel 204 returns to the rotation locked state in which rotation of the reel 204 with respect to the case 202 is impeded.

In recent years, not only horizontal-type drive devices, in which the recording tape cartridge 200 is loaded such that the axial direction of the reel 204 coincides with the vertical direction, but also vertical-type drive devices, in which the recording tape cartridge 200 is loaded such that the axial direction of the reel 204 coincides with the horizontal direction, have come to be used.

In a vertical-type drive device, there are cases in which the reel 204 moves in the radial direction with respect to the case 202 due to gravity. The applicant of the present application has already filed patent applications (see, for example, Japanese Patent Application Laid-Open (JP-A) No. 2002-343058) which propose, as a countermeasure to this problem, a structure in which the clearance between the inner peripheral portion of the reel hub 210 and the braking member 220, which is supported at the case 202, is made to be small, such that radial direction movement of the reel 204 with respect to the case 202 is restricted via the braking member 220. Specifically, a plurality of standing ribs 228, which oppose the outer peripheral surface of the braking member 220, are formed so as to project along the axial direction at the inner peripheral surface of the reel hub 210.

In this way, the amount of movement of the reel 204 with respect to the case 202 within a vertical-type drive device is restricted, and the reel gear 214 of the reel 204 and the drive gear 212A of the drive device can mesh together appropriately. Note that the reason why the standing ribs 228 are formed to project at the inner peripheral surface of the reel hub 210 is as follows: the upper flange 204B is fixed in a state in which an annular rib 230, which is formed at the inner edge portion of the upper flange 204B, has entered into the reel hub 210. The braking member 220 is formed to have a diameter which is quite small as compared with the inner diameter of the reel hub 210, so that the braking member 220 can thereafter be inserted in and assembled into the reel hub 210 from the top end opening portion of the reel hub 210. Thus, the braking member 220 joggles within the reel hub 210. The standing ribs 228 are provided so as to eliminate such joggling.

In the recording tape cartridge, when the pressure by which the recording tape is wound the reel hub 210 is low, air or the like enters in between the layers of the recording tape. The frictional force between the layers decreases, which becomes a cause of offset between the layers ("steps" arise at the layers). These steps become a cause of the transverse direction end portions (edges) of the recording tape contacting the flanges or the like, or the recording surface being damaged by the edges of adjacent layers of the recording tape which have become offset, or the like. Thus, the pressure by which the recording tape is wound on the reel hub 210 must be set to be high.

However, in the conventional recording tape cartridge 200 such as that described above, the top end portion of the reel hub 210 is open. Thus, there are cases in which, in a vicinity of this open end of the reel hub 210, the strength with respect to the pressure of winding the recording tape is insufficient. In particular, a high-density recording tape requires an even higher pressure of winding onto the reel hub 210, and the problem of insufficient strength becomes marked.

Thus, the strength of the reel hub 210 has been improved by the material itself by mixing glass fibers into the resin material forming the reel 204. However, it is easy for glass fibers to damage the mold for molding the reel 204. Therefore, in consideration of the lifespan of the mold and the number of times the mold can be used while still in a good condition, the upper limit of the amount of glass fibers which can be included in the resin material is appropriately about 30%. There are limits to the improvement of the strength of reel hubs for high-density recording tapes, which reel hubs are formed so as to also include glass fibers.

Moreover, using the upper flange 204B to reinforce the vicinity of the open end of the reel hub 210 is not practical because this gives rise to deformation at the upper flange due to the pressure of winding, and causes wobbling of the surface of the reel 204.

A given effect of reinforcing the reel hub 210 is achieved by providing the standing ribs 228. However, the standing ribs 228 are thick portions of the reel hub 210 and are a cause of deterioration of the roundness of the reel hub 210. Thus, from this standpoint, it is preferable to not provide the standing ribs 228.

On the other hand, in order to achieve the effect of reinforcing the upper end portion of the reel hub 210 by the standing ribs 228, the standing ribs 228 must be provided up to a vicinity of the top end of the reel hub 210. However, in this case, when the reel rotates 204, it is necessary to prevent the standing ribs 228, which rotate integrally with the reel 204, and the braking member 220, which does not rotate, from interfering with each other. The clearance between the standing ribs 228 and the outer peripheral surface of the braking member 220 cannot be made sufficiently small. Thus, it is difficult to sufficiently suppress radial direction movement of the reel 204 with respect to the case 202 via the braking member 220.

Namely, it is difficult for the standing ribs 228 to sufficiently suppress radial direction movement of the reel 204 (i.e., for the standing ribs 228 to address the problems of a vertical-type drive device), while sufficiently reinforcing the reel hub 210.

SUMMARY OF THE INVENTION

In view of the aforementioned, an object of the present invention is to provide a recording tape cartridge in which it is possible to suppress radial direction movement of a reel by a braking member which impedes rotation of the reel at the time when the recording tape cartridge is not being used, while ensuring the strength of a reel hub with respect to the pressure of winding of a recording tape therearound.

In order to achieve the above object, in accordance with one aspect of the present invention, there is provided a recording tape cartridge comprising: a tape; a reel having a reel hub on whose outer periphery the tape is wound, the reel hub having a cylindrical recess portion; a case which accommodates the reel such that the reel is rotatable; a braking-member able to move between a locking position at which the braking member prohibits rotation of the reel, and a non-locking position at which the braking member permits rotation of the reel, the braking member being provided within the cylindrical recess portion of the reel hub; and a reinforcing ring fit in the cylindrical recess portion of the reel hub, and being a member separate from the reel hub.

In accordance with another aspect of the present invention, there is provided a tape drive into which a tape cartridge is inserted so as to be freely removable therefrom, and which carries out at least one of reading of data and writing of data, the tape cartridge having: a tape; a reel having a reel hub on whose outer periphery the tape is wound, the reel hub having a cylindrical recess portion; a case which accommodates the reel such that the reel is rotatable; a braking member able to move between a locking position at which the braking member prohibits rotation of the reel, and a non-locking position at which the braking member permits rotation of the reel, the braking member being provided within the cylindrical recess portion of the reel hub; and a reinforcing ring fit in the cylindrical recess portion of the reel hub, and being a member separate from the reel hub, the tape drive comprising a driving member for one of directly and indirectly forcing movement of the braking member at a time when the tape cartridge is inserted.

BRIEF DESCRIPTION OF THE DRAWINGS

FIG. 5 is views, as seen with the upper case removed, showing processes of opening an opening of the recording tape cartridge relating to the embodiment of the present invention, where

FIG. 10A is a side view at the time rotation of the reel is locked, FIG. 10B is a side view of a process in which the locking of the rotation of the reel is cancelled, or of a process in which the reel returns to the rotation locked state, and FIG. 10C is a side view at the time the reel rotates.

DETAILED DESCRIPTION OF THE INVENTION

Hereinafter, a recording tape cartridge 10 relating to an embodiment of the present invention will be described on the basis of FIGS. 1 through 10. First, the basic, overall structure of the recording tape cartridge 10, and the structures of an opening and a door will be described. Then, a reel 14, which is a main portion of the present invention, and a braking means, which impedes rotation of the reel 14 when the recording tape cartridge 10 is not in use, will be described. Note that, for convenience of explanation, the direction of loading the recording tape cartridge 10 into a drive device, which is denoted by arrow A, is the forward direction (front side) of the recording tape cartridge 10. Further, the direction of arrow B, which is orthogonal to arrow A, is the rightward direction.

(Overall Structure of Recording Tape Cartridge)

Figure 1:
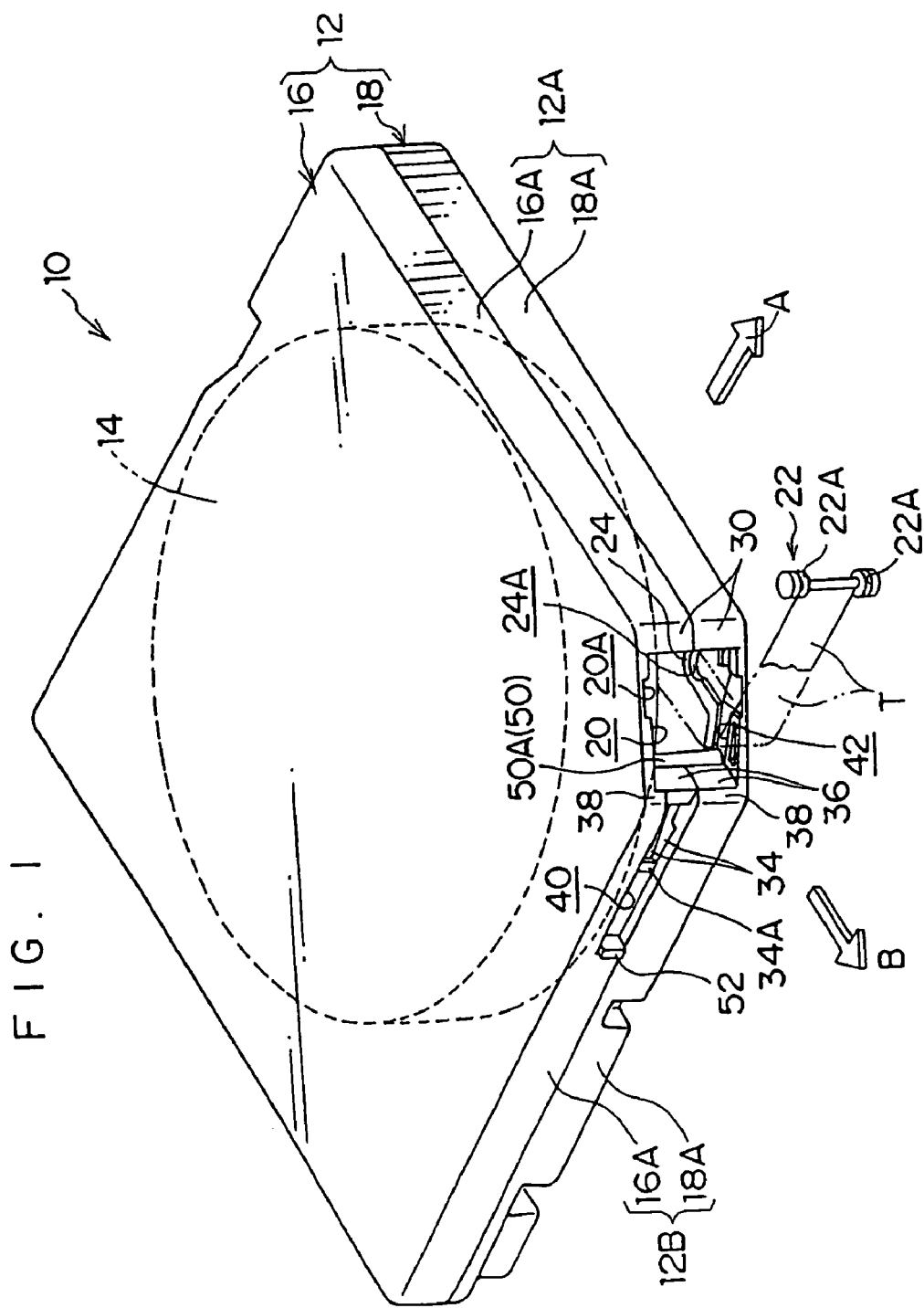
FIG. 1 is a perspective view showing the overall structure of a recording tape cartridge relating to an embodiment of the present invention.

The overall structure of the recording tape cartridge 10 is shown in perspective view in FIG. 1. A schematic exploded perspective view of the recording tape cartridge 10 is shown in FIG. 2.

Figure 2:
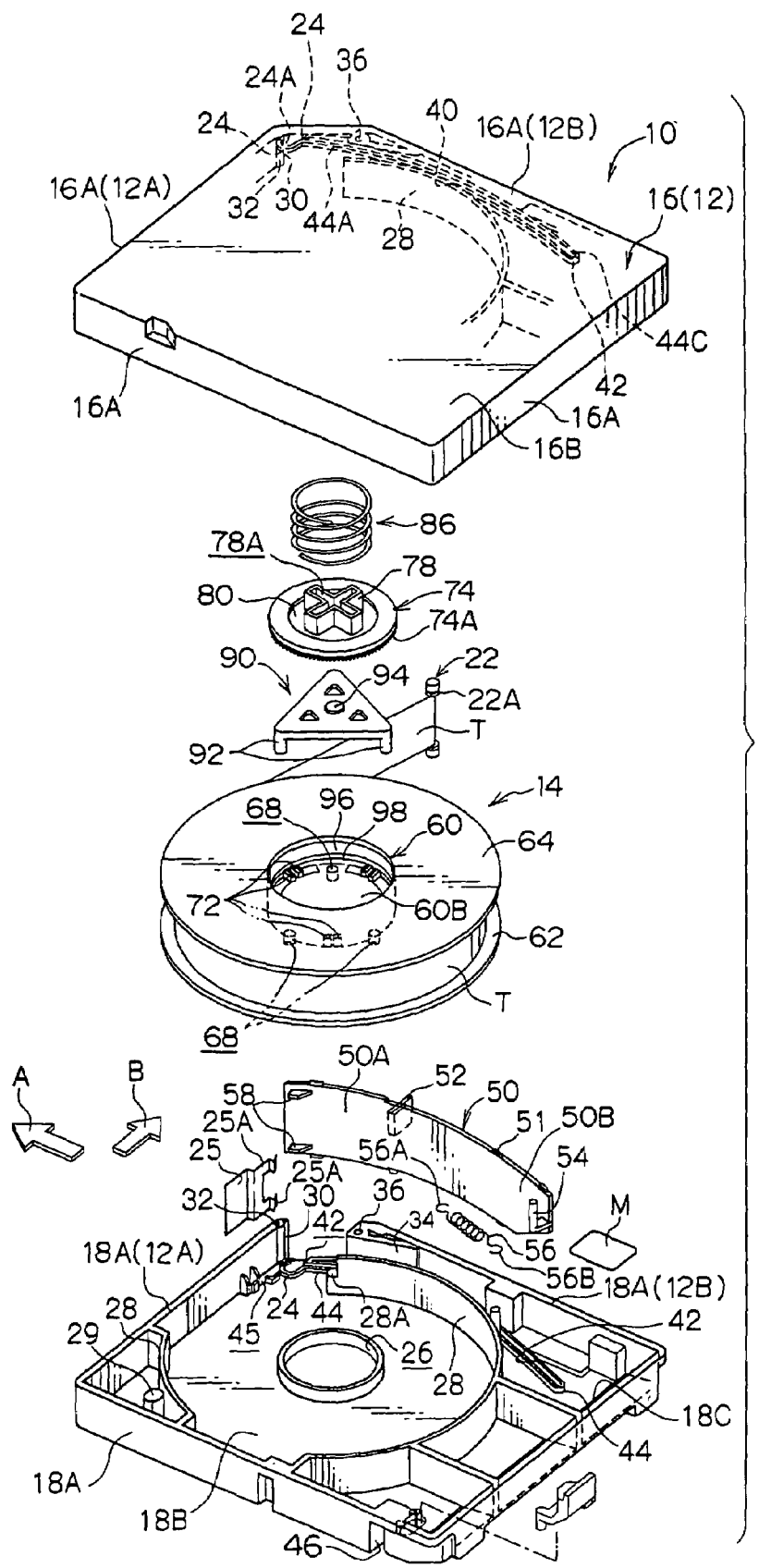
FIG. 2 is an exploded perspective view of the recording tape cartridge relating to the embodiment of the present invention.

As shown in FIGS. 1 and 2, the recording tape cartridge 10 is structured such that a single reel 14, on which is wound a magnetic tape T serving as a recording tape which is an information recording/playback medium, is rotatably accommodated within a case 12 which is substantially rectangular as seen in plan view. The structure of the reel 14 will be described later.

The case 12 is formed by joining together an upper case 16 and a lower case 18 with peripheral walls 16A, 18A thereof opposing each other. The front right corner portion of each of the upper case 16 and the lower case 18, which is one corner portion at the leading side in the direction of loading the recording tape cartridge 10 into a drive device, is cut off. A space for accommodating the reel 14, on which the magnetic tape T is wound, is provided at the interior of the case 12. The corner portion of the upper case 16 and the lower case 18, at which corner portion the peripheral walls 16A, 18A have been cut off, forms an opening 20 which is for pulling-out of the magnetic tape T. The detailed structures of the opening 20 and a door 50, which opens and closes the opening 20, will be described later.

A leader pin 22, which is pulled-out while being anchored (engaged) by a pull-out means of a drive device, is connected to the free end of the magnetic tape T which is pulled out from the opening 20. An annular groove 22A is formed in each of the end portions of the leader pin 22 which project out further than the transverse direction end portions of the magnetic tape T. The annular grooves 22A are anchored by hooks or the like of the pull-out means. In this way, the hooks or the like do not contact and scratch the magnetic tape T at the time of pulling-out the magnetic tape T.

A pair of upper and lower pin stands 24, which position and hold the leader pin 22 within the case 12, are provided at the inner side of the opening 20 of the case 12. The pin stands 24 are formed in semi-cylindrical shapes which open in the direction of arrow B. Both end portions of the leader pin 22, which is in a state of standing upright, are held in concave portions 24A of the pin stands 24. The pin stands 24 are continuous with ribs 44 which will be described later.

A plate spring 25 is fixed in the vicinity of the pin stands 24. The plate spring 25 engages the upper and lower end portions of the leader pin 22, and holds the leader pin 22 at the pin stands 24. When the leader pin 22 enters into and exits out from the pin stands 24, arm portions 25A of the plate spring 25 are appropriately elastically deformed, such that movement of the leader pin 22 is permitted.

Further, a gear opening 26, which serves as an "opening" for exposing a reel gear 66 (which will be described later) of the reel 14 to the exterior, is formed in the central portion of the lower case 18. The reel 14 is driven to rotate within the case 12 by the reel gear 66 meshing with a driving gear of a drive device. Further, the reel 14 is held so as to not joggle by play restricting walls 28 which project out at portions of the inner surfaces of the upper case 16 and the lower case 18, and which serve as inner walls which are on a circular locus which is coaxial with the gear opening 26. Moreover, an annular rib 26A projects toward the inner side of the case 12 at the edge portion of the gear opening 26 at the lower case 18. The annular rib 26A is for positioning of the reel 14.

A bag portion 28A, in which a hole for position regulation is formed, is continuous with the end portion of the play restricting wall 28 in a vicinity of the opening 20. Further, a bag portion 28B, in which is formed a hole for position regulation which is a long hole, stands erect in the space sandwiched between the front left corner portion of the case 12 and the play restricting wall 28. The bag portions 28A, 28B are disposed on a single straight line which extends along the direction of arrow B. End portions of the play restricting walls 28, except for the end portion thereof at which the bag portion 28A is continuous, are continuous with the peripheral wall 16A or the peripheral wall 18A of the case 12, so as to partition the outer sides of the play restricting walls 28 and the space at which the reel 14 is set.

A memory board M, which stores various types of information, is set at the rear right portion of the lower case 18 for each recording tape cartridge 10. A portion of an inclined rear wall 18C forming the peripheral wall 18A is inclined at a predetermined angle and the memory board M is disposed so as to be inclined at a predetermined angle, such that sensing is possible at a drive device which reads from the bottom surface side and at a library device which reads from the rear surface side.

(Opening, and Structure of Case in Vicinity of Opening)

Figure 3:
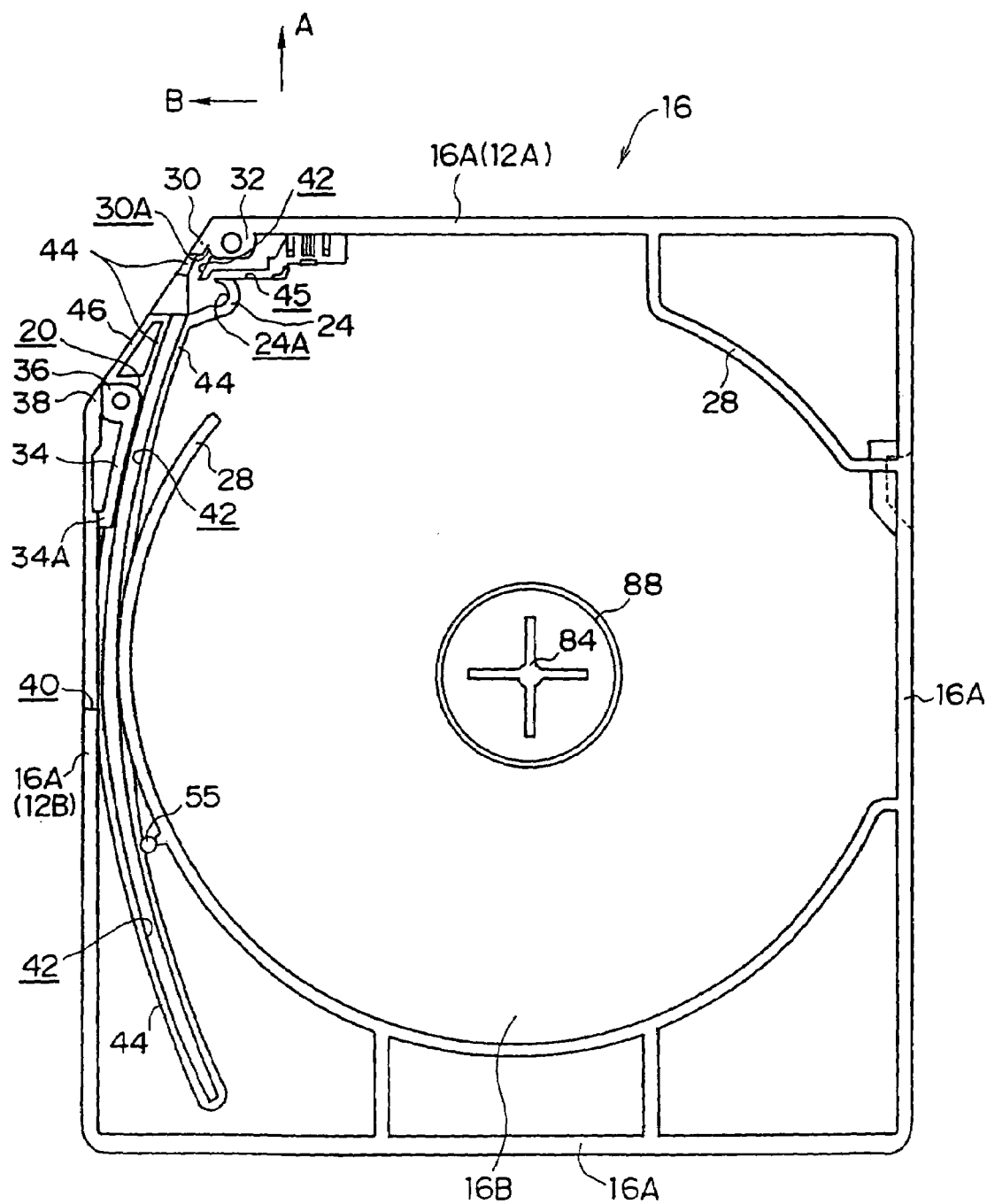
FIG. 3 is a bottom view of an upper case structuring the recording tape cartridge relating to the embodiment of the present invention.
Figure 4:
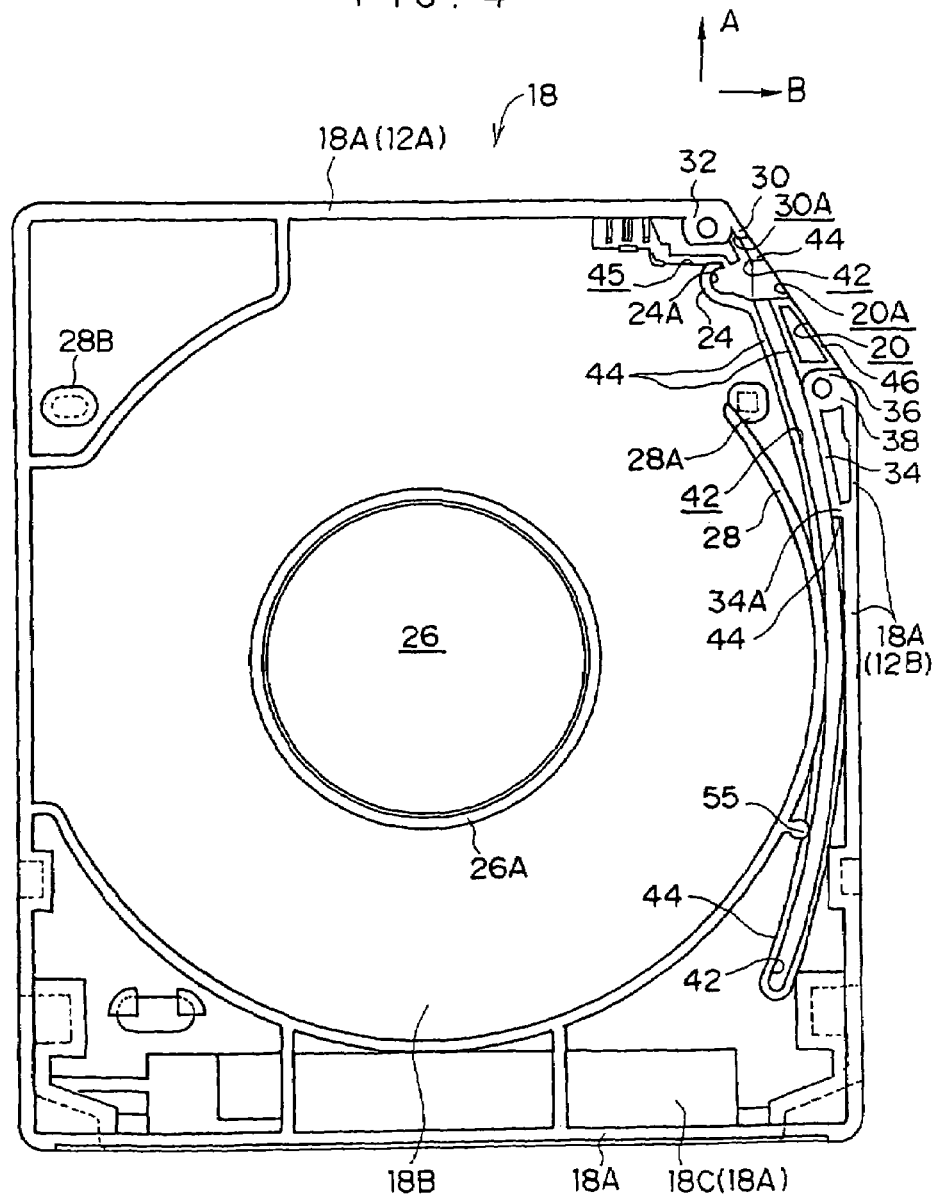
FIG. 4 is a plan view of a lower case structuring the recording tape cartridge relating to the embodiment of the present invention.

As shown in FIG. 3 (which is a bottom view of the upper case 16) and in FIG. 4 (which is a plan view of the lower case 18), a pair of upper and lower screw bosses 32 and a pair of upper and lower screw bosses 36 are provided at the front and rear edge portions of the opening 20, respectively. The screw bosses 32, 36, as well as other screw bosses which are not illustrated, are for the screwing-in of screws for joining the upper case 16 and the lower case 18.

The screw bosses 32, which are positioned at the front edge portion of the opening 20, are continuous with the right end portion of a front wall 12A of the case 12 (the front wall 12A is the portions of the peripheral walls 16A, 18A whose outer surfaces are directed in the direction of arrow A), and are continuous with a pair of upper and lower dustproofing walls 30 which are short and are bent along the plane of opening of the opening 20 from the right end portion of the front wall 12A. Concave portions 30A, into which the distal end portion of the door 50 which will be described later enters, are formed between the screw bosses 32 and the dustproofing walls 30.

The screw bosses 36, which are positioned at the rear edge portion of the opening 20, are continuous with bent walls 38 and with the front end portions of a pair of upper and lower arc-shaped walls 34. The bent walls 38 are formed such that the front end portion of a right wall 12B of the case 12 (the right wall 12B is the right side walls of the peripheral walls 16A, 18A which run along the direction of arrow A) is bent substantially along the plane of opening of the opening 20. The arc-shaped walls 34 are provided at the inner side of the right wall 12B. The upper and lower arc-shaped walls 34 are formed in an arc-shape which, in plan view, substantially corresponds to (the locus of movement of) the outer peripheral surface of the door 50 which will be described later. The upper and lower arc-shaped walls 34 extend rearward from the screw bosses 36 by a predetermined length, and are continuous with the right wall 12B (the peripheral wall 16A or the peripheral wall 18A) via short connecting walls 34A at the rear portions thereof.

A slit 40, which is of a predetermined length and serves as a window portion which communicates the interior and the exterior of the case 12, is formed in the right wall 12B of the case 12. The slit 40 is for exposing an operation projection 52 of the door 50 which will be described later. The slit 40 is formed by cutting out the lower portion of the peripheral wall 16A which forms the right wall 12B. The slit 40 opens toward the front as well by also cutting out the lower portion of the bent wall 38 of the upper case 16.

A guide groove 42 for guiding the door 50 is provided in each of the upper case 16 and the lower case 18 forming the case 12. The groove walls of the guide grooves 42 are structured by the ribs 44 standing erect at a ceiling plate 16B of the upper case 16 or a floor plate 18B of the lower case 18, the right wall 12B (either the peripheral wall 16A or the peripheral wall 18A), and the play restricting walls 28. The guide grooves 42 are thereby formed without making the ceiling plate 16B or the floor plate 18B thinner. The ribs 44 are continuous with the pin stands 24.

Each guide groove 42 is formed in an arc-shape which runs along a predetermined circumference whose proximal end is the concave portion 30A and which reaches the right rear corner portion of the case 12. This predetermined circumference is determined so as to pass (thread its way through) at the outer side of the screw bosses 32, the inner side of the screw bosses 36, and between the right wall 12B and the play restricting walls 28. In the present embodiment, the central position of this predetermined circumference (i.e., the center of rotation of the door 50 which will be described later) is set such that the left-right direction position (coordinate) thereof substantially coincides with a position further toward the outer side than the left end of the case 12, and the front-back direction position (coordinate) thereof substantially coincides with the center of rotation of the reel 14 (the axial center of the play restricting walls 28).

Further, the portion of the guide groove 42 positioned at the opening 20 is continuous with the concave portion 24A due to the rib 44 being cut-out at the right side of the pin stand 24, and is also continuous with a spring groove 45 in which the arm portion 25A of the plate spring 25 is disposed. Moreover, at the cut-out portion of the guide groove 42, a taper opening 20A, which guides the leader pin 22 into the case 12, is continuous with the concave portion 24A of the pin stand 24. In addition, a rib 46, which is formed along the rear edge of the taper opening 20A, the front edge of the screw boss 36, and the plane of opening of the opening 20, respectively, is continuous with the rib 44. In this way, the strength around the opening 20 of the case 12 can be ensured or improved.

Moreover, at the rear end of the rib 44, which forms the rear half portion of each guide groove 42, the rib 44 bends back in a substantial U shape and is closed. Moreover, the rib 44 of the upper case 16 is formed to be longer toward the rear than the rib 44 of the lower case 18. This is in order for the memory board M, which is disposed at the right wall 12B side, to not interfere with the door 50, because the inclined rear wall 18C (peripheral wall 18A) of the lower case 18 is formed as an inclined surface of a predetermined angle.

A pair of top and bottom spring catching pins 55 are provided at the longitudinally central portion of the inner side portion of the rear half portion of the rib 44. The spring catching pins 55 are continuous with the play restricting walls 28. The spring catching pin 55 at the lower case 18 side is formed to be longer. One end side annular portion 56A of a coil spring 56 which will be described later catches on the portion of this spring catching pin 55 which projects higher than the play restricting wall 28. The coil spring 56 is prevented from falling out due to the short spring catching pin 55 at the upper case 16 side abutting the spring catching pin 55 at the lower case 18 side.

The case 12 is formed by the upper case 16 and the lower case 18, which were described above, being fixed (joined) together by unillustrated screws being screwed, from beneath, into the screw bosses 32, 36 as well as other screw bosses, in a state in which the peripheral walls 16A, 18A abut one another. Further, by forming the opening 20 by cutting off the front right corner portion, the plane of opening of the opening 20 faces in the direction of arrow A and in the direction of arrow B. Thus, the pull-out means of a drive device can access and engage the leader pin 22 from the direction of arrow A, or from the direction of arrow B, or from between the direction of arrow A and the direction of arrow B. In this way, the area over which the pin stands 24 which hold the leader pin 22 can be set is broadened, and the region at which the pull-out means of the drive device can engage the leader pin 22 is broadened. Thus, the positions where the pin stands 24 are disposed can be set in accordance with the specifications of the drive device which engages the leader pin 22 from the direction of arrow A or from the direction of arrow B. Therefore, the degrees of freedom in designing the drive device are increased.

(Structure of Door)

The above-described opening 20 is opened and closed by the door 50 which serves as a shielding member. The door 50 is formed in an arc-shape which curves along the direction of plate thickness thereof, and whose curvature as seen in plan view coincides with the curvature of the guide grooves 42 (the predetermined circumference). Further, the portion of the door 50 at the front portion thereof (at least the portion thereof which closes the opening 20) where the plate width (height) is formed to be substantially the same as the opening height of the opening 20, is a closing portion 50A. The portion of the door 50 which is at the rear side of the closing portion 50A and whose plate width is slightly smaller than that of the closing portion 50A, is a driving portion 50B.

Figure 5A:
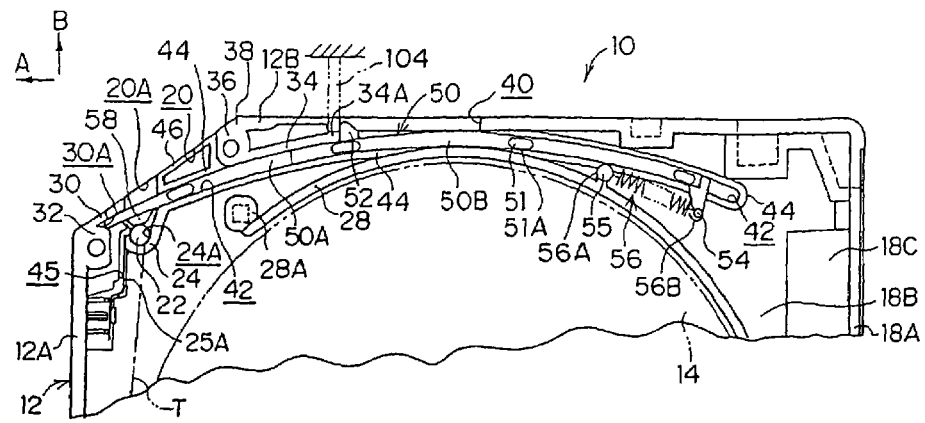
FIG. 5A is a plan view showing an initial state of engagement of an engaging projecting portion of a drive device with an operation projection of a door.

The plate length of the door 50 (the curved longitudinal dimension thereof) is determined such that, in the state in which the door 50 closes the opening 20, the rear end portion of the driving portion 50B is positioned in the right rear corner portion of the case 12 (see FIG. 5A). Note that the bottom rear portion of the driving portion 50B is cut obliquely in order to avoid the memory board M which is disposed at the inclined surface of the inclined rear wall 18C of the lower case 18.

The door 50 closes the opening 20 (see FIG. 5A) in a state in which the distal end portion of the closing portion 50A enters into the concave portions 30A which are positioned at the outer sides of the screw bosses 32. When the door 50 moves (rotates) substantially rearward along the guide grooves 42 so as to open the opening 20 (see FIG. 5B) and the outer peripheral surface of a vicinity of the distal end of the closing portion 50A reaches a vicinity of the inner sides of the screw bosses 36, the opening 20 is completely opened (see FIG. 5C). Further, the door 50 closes the opening 20 by rotating in the direction substantially opposite to the direction at the time of opening the opening 20.

In this way, the door 50 is curved so as to open and close the opening 20 by rotating without jutting out from the predetermined circumference which is the locus of movement of the door 50. It suffices for the center of rotation and the radius of rotation of the door 50 (i.e., the configuration of the guide grooves 42) to be appropriately determined in accordance with the positions of the front and rear edge portions of the opening 20 (the screw bosses 32, 36) which are determined by the requirements of the drive device, or in accordance with the angle of the plane of opening of the opening 20 which is determined by the requirements of the library device, or the like.

Further, a plurality of convex portions 51, which enter into the upper and lower guide grooves 42, project at the upper and lower ends of the door 50. The projecting heights of the convex portions 51 differ at the closing portion 50A and the driving portion 50B. However, the distance from the transverse direction central line (running along the longitudinal direction) of the door 50 to the peak portion of each convex portion 51 is constant. In this way, the top and bottom convex portions 51 slide along the ceiling plate 16B or the floor plate 18B which are the floor portions of the guide grooves 42.

Projections 51A (see FIG. 5), whose peak portions run along the end surfaces in the direction of the plate thickness of the door 50, project at the both sides, in the direction of plate thickness of the door 50, of each convex portion 51. The projections 51A slide along the groove walls (the ribs 44 and the like) of the guide grooves 42. Note that the convex portion 51 which is positioned furthest toward the front is disposed such that, when the opening 20 is being opened or closed, it does not enter into the taper opening 20A which is continuous with the guide groove 42.

At the time when the door 50 is opening and closing the opening 20, the door 50 is guided in the guide grooves 42 by the convex portions 51 and the projections 51A, and does not jut out from the aforementioned locus of movement. The door 50 twists its way through at the outer sides of the screw bosses 32 and the inner sides of the screw bosses 36 and between the right wall 12B and the play restricting walls 28, and reliably opens the opening 20.

The operation projection 52, which serves as an operation portion, projects along the radial direction of the door 50 at the outer peripheral portion in a vicinity of the front end (the closing portion 50A side) of the driving portion 50B of the door 50. The operation projection 52 is exposed to the exterior of the case 12 through the slit 40. Accompanying the loading (relative movement) of the recording tape cartridge 10 into a drive device, the operation projection 52 engages with an engaging projecting portion 104 which enters in from the portion of the slit 40 which opens toward the front. The operation projection 52 thereby moves the door 50 in the direction of opening the opening 20.

A substantially L-shaped spring catching portion 54 projects toward the inner surface side of the door 50 at the rear end portion of the driving portion 50B of the door 50. The upper side of the spring catching portion 54 is the free end thereof. The spring catching portion 54 is for anchoring and holding the coil spring 56 serving as an urging means. Specifically, the annular portions 56A, 56B for anchoring are provided at the end portions of the coil spring 56. The spring catching pins 55 of the case 12 are inserted through the annular portion 56A such that the annular portion 56A is anchored and held at the case 12. The spring catching portion 54 is inserted through the annular portion 56B such that the annular portion 56B is anchored and held at the door 50.

In this way, the door 50 is urged in the direction of closing the opening 20 by the urging force of the coil spring 56, and usually closes the opening 20. The coil spring 56 has a length which reaches the rear right corner portion of the case 12 in the state in which the door 50 closes the opening 20 as described above. Therefore, the space between the play restricting walls 28 and the peripheral walls 16A, 18A (the inclined rear wall 18C) at this rear right corner portion can be utilized effectively.

Stoppers 58, which abut the upper end portion side surface and the lower end portion side surface of the leader pin 22 when the opening 20 is closed, project at the inner surface of the closing portion 50A of the door 50. The stoppers 58 can reliably prevent the leader pin 22 from falling out from the pin stands 24 due to the impact of a drop or the like.

Figure 5B:
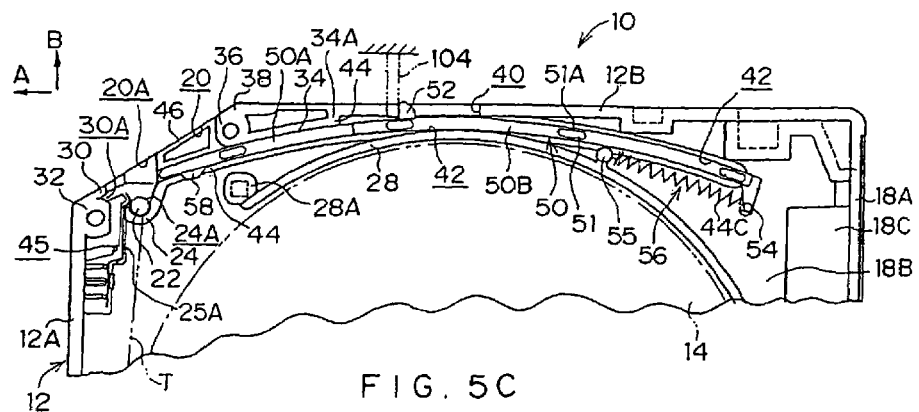
FIG. 5B is a plan view showing a state during the process of opening the opening.
Figure 5C:
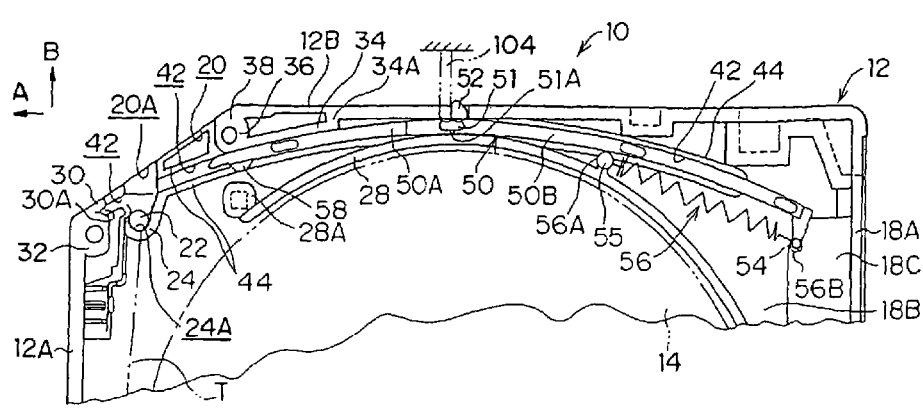
FIG. 5C is a plan view showing a state in which opening of the opening has been completed.

Due to the operation of the recording tape cartridge 10 being loaded into a drive device, the operation projection 52 engages with the engaging projecting portion 104 of the drive device (see FIGS. 5A through 5C). The above-described door 50 thereby moves with respect to the case 12 against the urging force of the coil spring 56, and opens the opening 20. When the recording tape cartridge 10 is to be ejected from the drive device, the door 50 closes the opening 20 due to the urging force of the coil spring 56.

Moreover, the door 50, which is curved in an arc-shape, opens and closes the opening 20 (which is inclined with respect to the direction of arrow A) by rotating so as to circle around the outer sides of the reel 14 and the pin stands 24 (the leader pin 22), without jutting out from the locus of movement which runs along the curved configuration of the door 50. The door 50 does not jut out from the region of the outer shape of the case 12 at the time of opening and closing the opening 20.

(Structures of Reel and Braking Mechanism)

Figure 6:
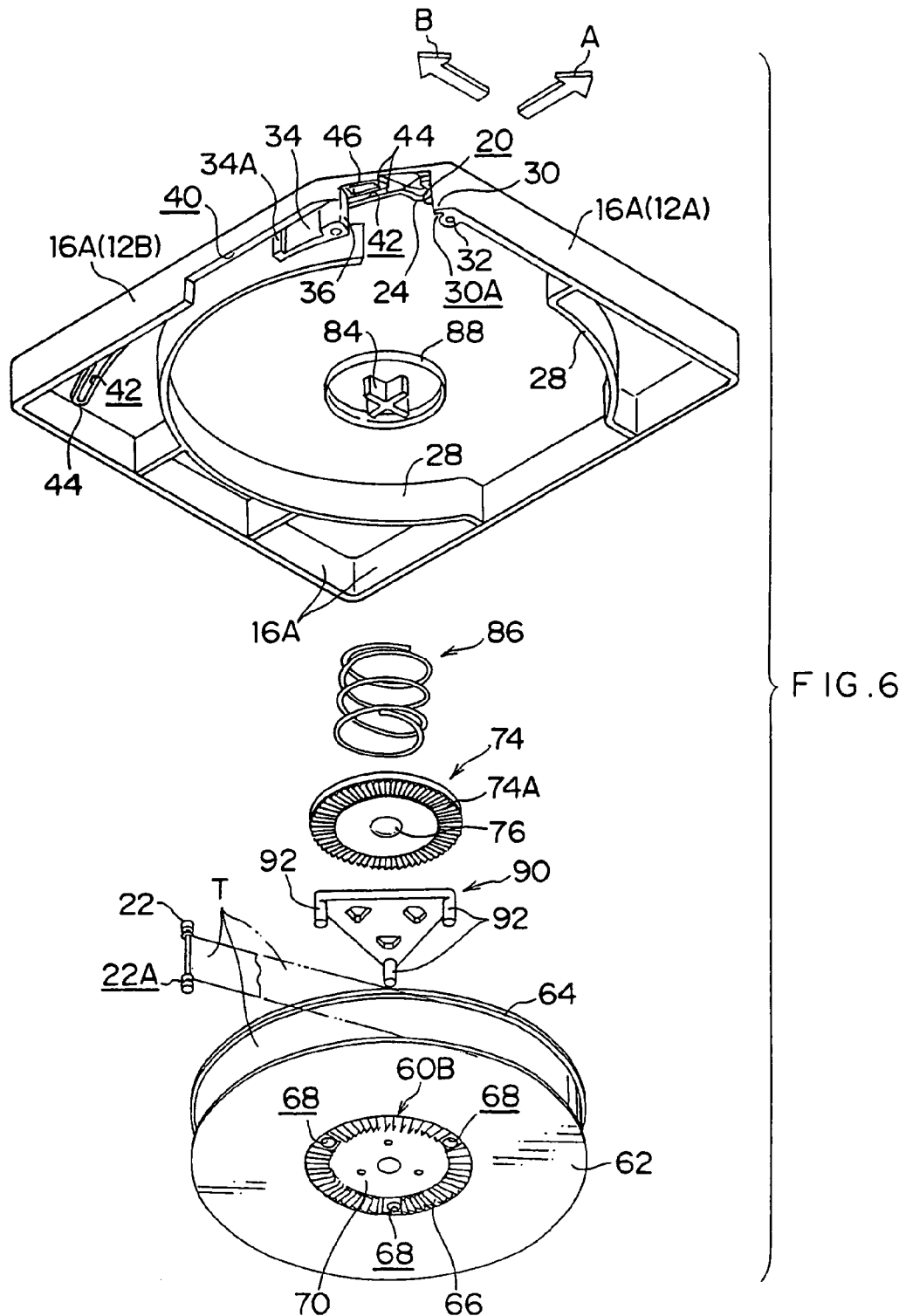
FIG. 6 is an exploded perspective view, as seen from below, showing a braking means and a reel structuring the recording tape cartridge relating to the embodiment of the present invention.
Figure 9:
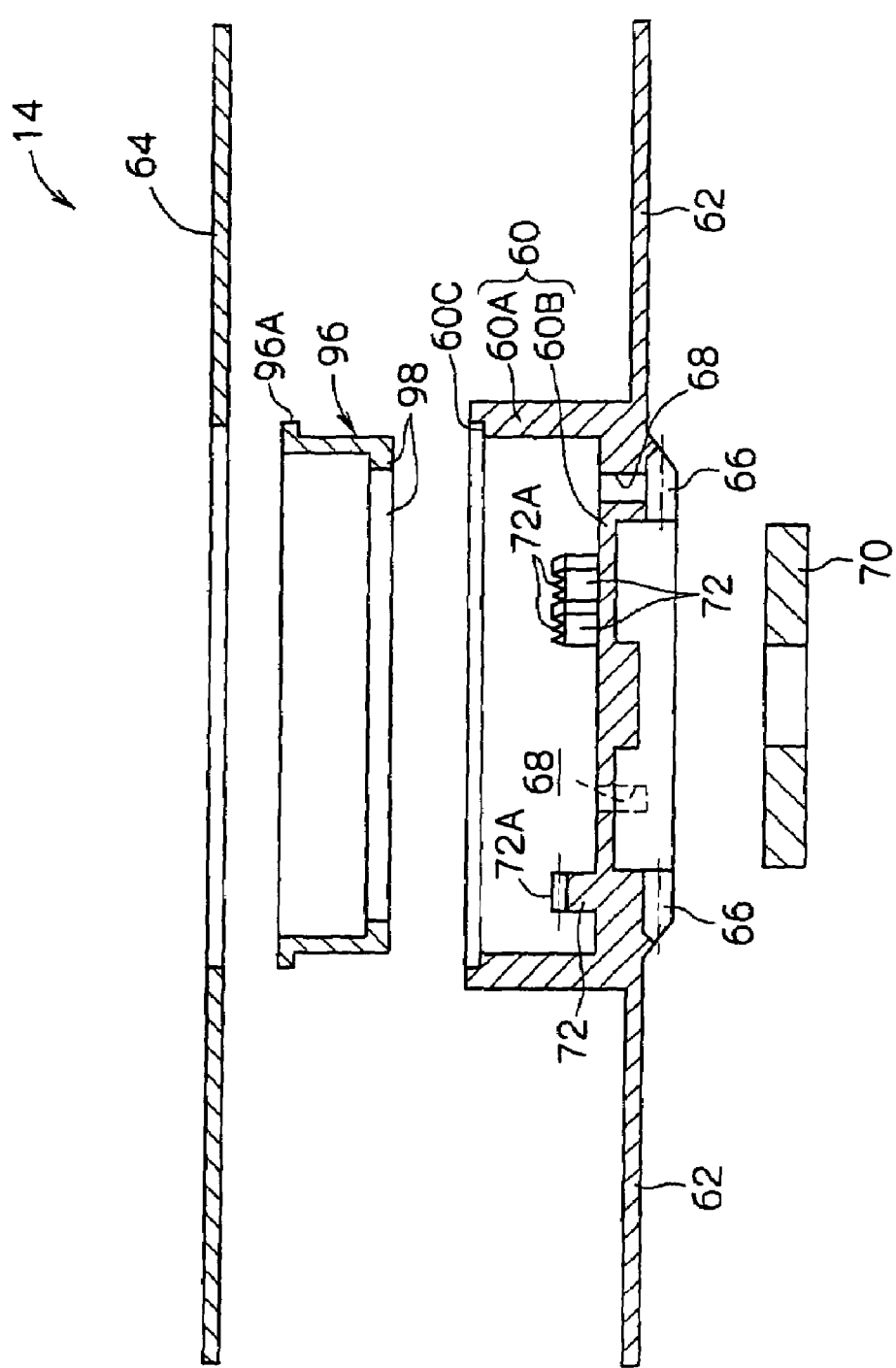
FIG. 9 is an exploded cross-sectional view of the reel structuring the recording tape cartridge relating to the embodiment of the present invention.
Figure 10:
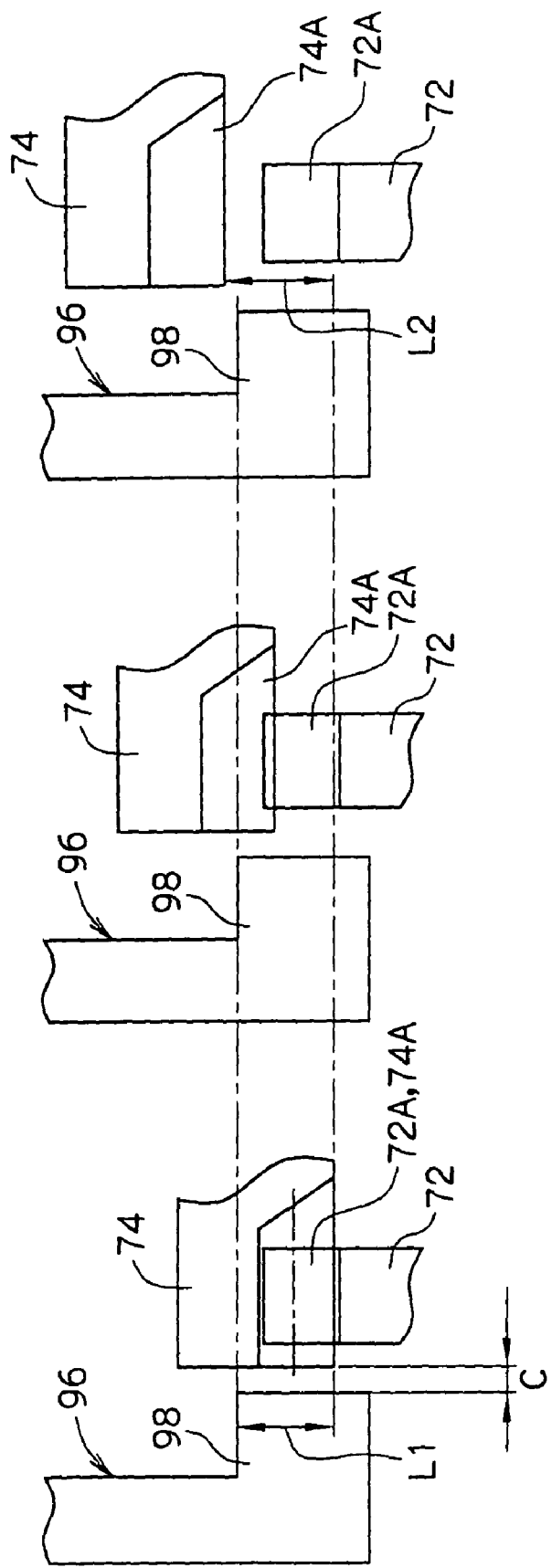
FIG. 10 is enlarged views showing the positional relationship between a braking member and a restricting ring portion as the braking member moves in the recording tape cartridge relating to the embodiment of the present invention, where
Figure 11:
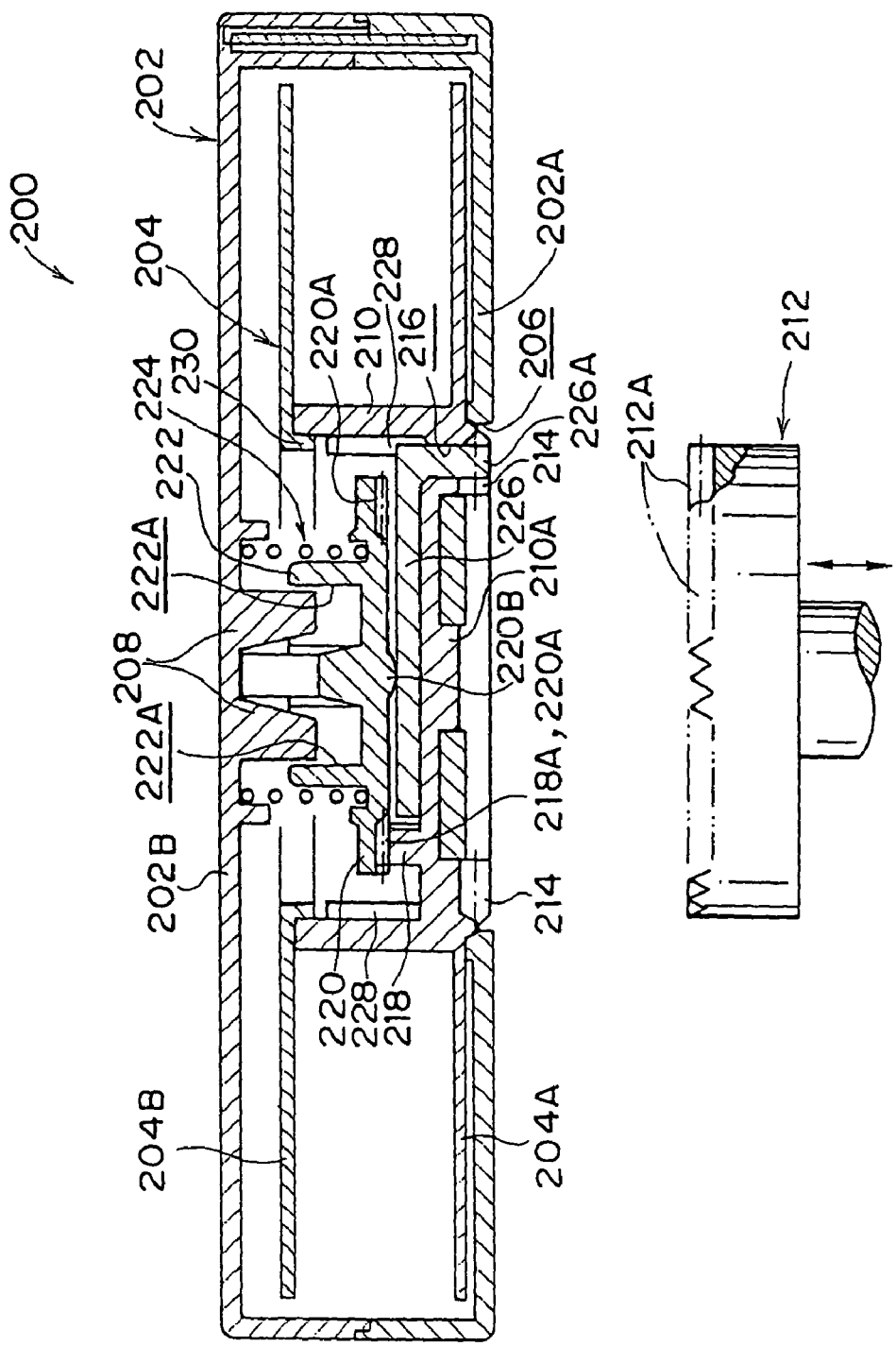
FIG. 11 is a cross-sectional view showing a rotation locked state of a reel in a conventional recording tape cartridge.
Figure 12:
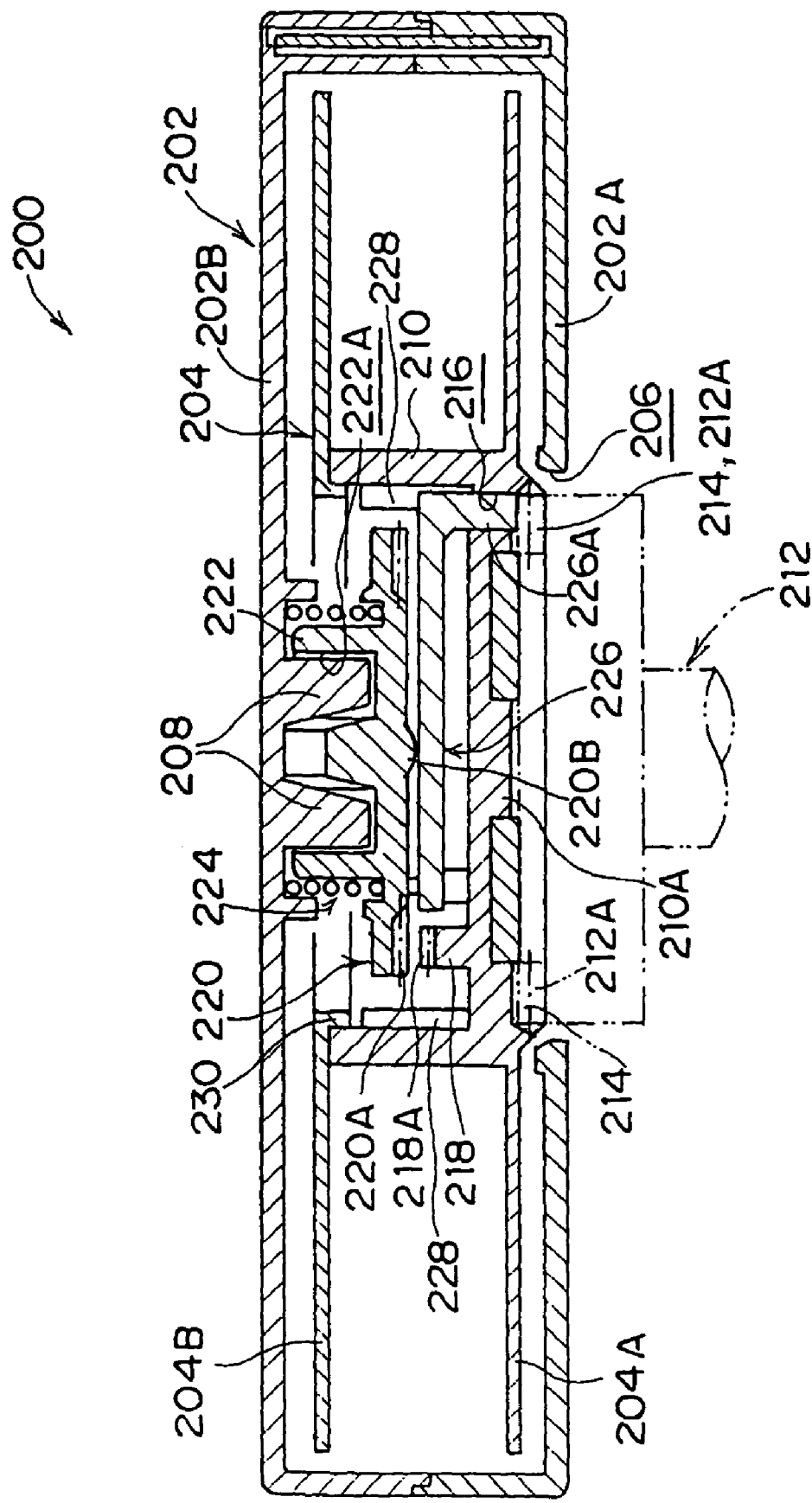
FIG. 12 is a cross-sectional view showing a rotatable state of the reel in the conventional recording tape cartridge.

As shown in FIGS. 2 and 6, and in FIG. 9 which is an exploded cross-sectional view, the reel 14 has a reel hub 60 which is substantially shaped as a hollow cylinder having a floor. The reel hub 60 has a tubular portion 60A, on whose outer peripheral surface the magnetic tape T is wound, and a floor portion 60B which closes the bottom portion of the tubular portion 60A. A lower flange 62 extends coaxially and outwardly in the radial direction, from a vicinity of the floor portion 60B side end portion (i.e., the bottom end portion) of the reel hub 60. The reel hub 60 and the lower flange 62 are formed integrally by resin molding.

On the other hand, an upper flange 64 is joined by ultrasonic welding or the like coaxially to the upper end portion of the reel hub 60. The inner diameter of the upper flange 64 is substantially the same as the inner diameter of the tubular portion 60A, and the outer diameter of the upper flange 64 is the same as the outer diameter of the lower flange 62.

In this way, between the opposing surfaces of the lower flange 62 and the upper flange 64 at the reel 14, the magnetic tape T is wound around the outer peripheral surface of the tubular portion 60A of the reel hub 60, and the tubular portion 60A is open upwardly. The outer diameters of the lower flange 62 and the upper flange 64 are slightly smaller than the inner diameters of the play restricting walls 28 of the case 12, such that the reel 14 can rotate within the case 12.

Further, the bottom end portion of the floor portion 60B of the reel hub 60 projects slightly more than the bottom surface of the lower flange 62. The reel gear 66, which is formed in an annular form, is provided in a vicinity of the outer periphery of this bottom end surface. The reel gear 66 can mesh with a driving gear 102 which is provided at the distal end of a rotating shaft 100 of a drive device.

Through holes 68, which pass through the floor portion 60B (the reel gear 66) are provided at three places which are spaced apart uniformly on a circumference at the region where the reel gear 66 is set. The diameter of each through hole 68 is larger than the gear pitch of the reel gear 66. The teeth of the reel gear 66 are not provided around each through hole 68.

Moreover, a reel plate 70, which is an annular plate formed of a magnetic material which can be attracted by a magnet, is provided integrally by insert molding at the inner side of the reel gear 66 at the bottom end surface of the floor portion 60B of the reel hub 60.

Figure 7:
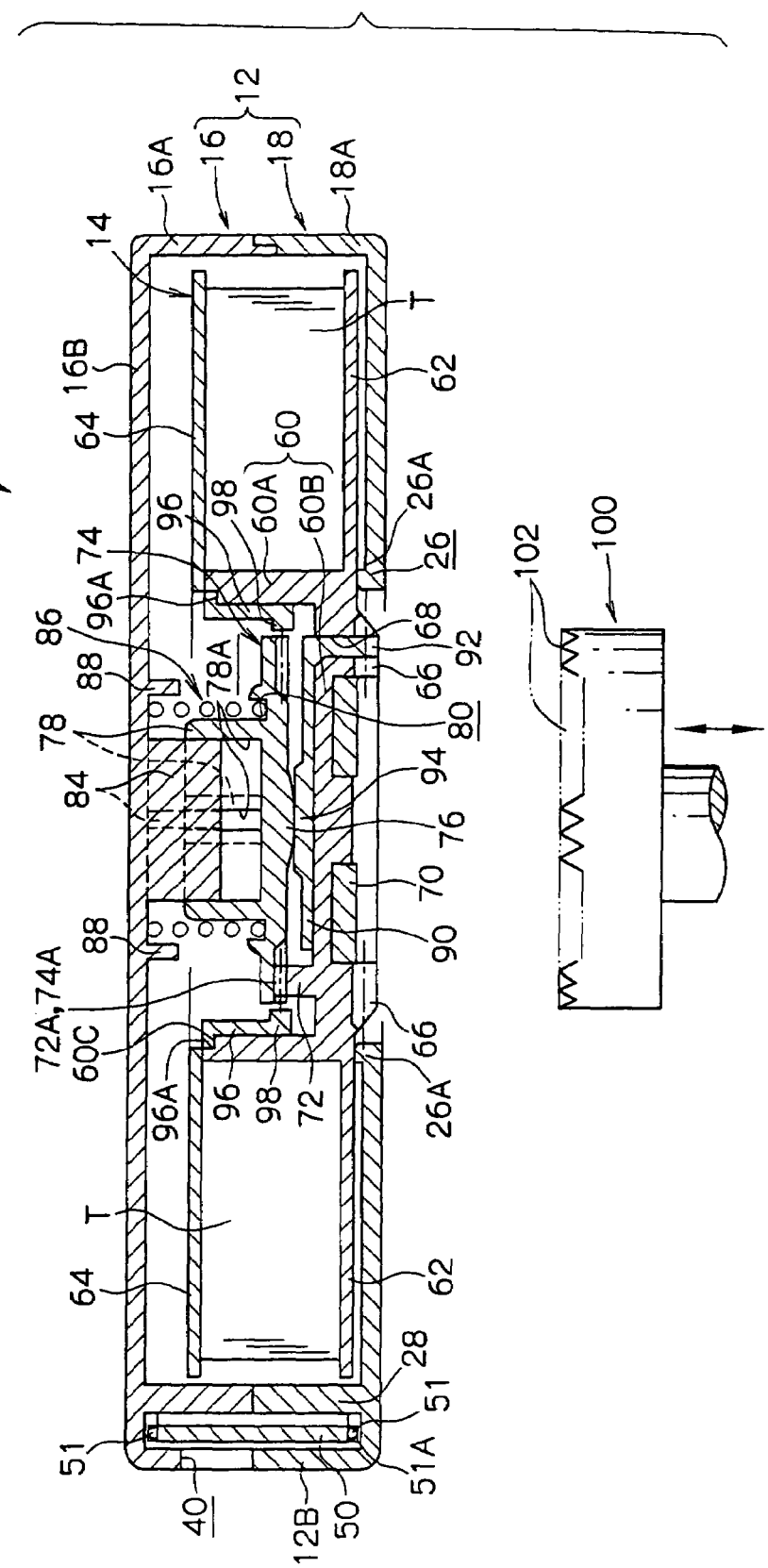
FIG. 7 is a cross-sectional view showing a rotation locked state of the reel in the recording tape cartridge relating to the embodiment of the present invention.

As shown in FIG. 7, the bottom end portion of the floor portion 60B of the reel hub 60, which bottom end portion projects further than the lower flange 62, enters into (is fit with play in) the gear opening 26 of the case 12 in a state in which the radial direction inner end portion of the lower flange 62 abuts the top end portion of the annular rib 26A. In this way, the reel gear 66 and the reel plate 70 are exposed to the exterior of the case 12.

On the other hand, pairs of anchor projections 72, each of which serves as an "engaging portion" in the present invention, stand erect so as to be spaced evenly apart on a circumference at three places, between the respective through holes 68, at the top surface of the floor portion 60B of the reel hub 60 (see FIG. 2). (Namely, there are a total of six anchor projections 72.) A gear tooth 72A is formed at the distal end portion (the top end portion) of each anchor projection 72 (see FIG. 9). The gear teeth 72A can mesh with a braking gear 74A of a braking member 74 which will be described later.

A reinforcing ring 96, which serves as a "tubular member" which is a separate member, is fit together with the inner peripheral surface of the reel hub 60 of the reel 14 which was described above. The structure of the reinforcing ring 96 will be described later.

The recording tape cartridge 10 is equipped with a braking means for impeding rotation of the reel 14 when the recording tape cartridge 10 is not in use. This braking means has the braking member 74 which serves as a "braking member". The braking member 74 is formed in a substantial disc shape. The braking gear 74A, which can mesh with the gear teeth 72A of the reel 14, is formed in an annular form in a vicinity of the outer periphery of the bottom end surface of the braking member 74.

A sliding-contact projecting portion 76, which abuts a release pad 90 which will be described later, projects at the axially central portion of the bottom surface of the braking member 74. The sliding-contact projecting portion 76 is shaped as a substantially spherical surface, and substantially point-contacts the release pad 90.

On the other hand, as shown in FIG. 2, a cross-shaped projection 78 stands erect at the top surface of the braking member 74. An insertion groove 78A, which is substantially cross-shaped in plan view, is formed at the inside of the cross-shaped projection 78. Further, a spring receiving recess 80, which is surrounded by a wall portion which is annular as seen in plan view, is formed at the outer side of the cross-shaped projection 78 at the top surface of the braking member 74.

The braking member 74, which is structured as described above, is inserted into the tubular portion 60A of the reel hub 60 so as to be substantially coaxial with the reel 14 and so as to be movable in the vertical directions (the axial direction of the reel 14). Namely, due to the braking member 74 moving in the vertical directions, the braking gear 74A can move between a position of meshing with the gear teeth 72A of the anchor projections 72 which are provided at the reel hub 60 (i.e., a rotation locked position), and a position at which the aforementioned meshing is released (i.e., a released position).

Further, a cross-shaped rib 84 (see FIGS. 3 and 6), which serves as an "engaging projection" and projects downward from the ceiling plate 16B of the case 12, enters into the insertion groove 78A of the cross-shaped projection 78 of the braking member 74. Due to the cross-shaped rib 84 engaging with the cross-shaped projection 78 (the groove walls of the insertion groove 78A), rotation of the braking member 74 with respect to the case 12 is impeded.

In this way, in the state in which the braking gear 74A of the braking member 74 meshes with the gear teeth 72A of the reel hub 60, the braking member 74 impedes rotation of the reel 14. Note that the cross-shaped rib 84 is maintained in a state of being inserted in the insertion groove 78A along the entire vertical direction stroke of movement of the braking member 74, and also functions to guide the braking member 74 in the vertical directions.

Further, a compression coil spring 86 serving as an "urging means" is disposed between the ceiling plate 16B and the spring receiving recess 80 of the braking member 74. One end portion of the compression coil spring 86 enters into the spring receiving recess 80, whereas the other end portion of the compression coil spring 86 enters in at the inner side of an annular wall portion 88 which projects from the ceiling plate 16B. The position of the compression coil spring 86 does not become offset in the radial direction.

Due to the urging force of the compression coil spring 86, as shown in FIG. 7, the braking member 74 is urged downward, and usually, the braking gear 74A meshes with the gear teeth 72A such that inadvertent rotation of the reel 14 is reliably prevented (i.e., the braking member 74 is positioned at the rotation locked position). Further, due to this urging force, the reel 14, which meshes with the braking member 74 at the anchor projections 72, also is urged downward, and, as described above, the lower flange 62 abuts the annular rib 26A such that the reel 14 does not joggle within the case 12.

The release pad 90, which serves as a releasing member, is disposed between the braking member 74 and the floor portion 60B within the reel hub 60 (the tubular portion 60A) of the reel 14. The release pad 90 is formed in the shape of a flat plate which substantially is an equilateral triangle as seen in plan view. Three leg portions 92, which are solid cylindrical and correspond to the through holes 68 of the floor portion 60B, project from the bottom surface of the release pad 90 in vicinities of the respective vertices. A sliding-contact projecting portion 94, which abuts the sliding-contact projecting portion 76 of the braking member 74, projects out slightly from the central portion of the top surface of the release pad 90.

In the state in which the respective leg portions 92 are inserted through the through holes 68 so as to be movable in the vertical directions, the release pad 90 is placed on the floor portion 60B of the reel hub 60 so as to not interfere with the anchor projections 72 (i.e., the bottom surface of the release pad 90 abuts the top surface of the floor portion 60B). In this state, the leg portions 92 project further than the bottom end portions of the through holes 68, such that the distal ends of the leg portions 92 and the addenda of the reel gear 66 are substantially the same level. Due to the sliding-contact projecting portion 94 of the release pad 90 abutting the sliding-contact projecting portion 76 of the braking member 74, the release pad 90 maintains the above-described projected state of the leg portions 92 due to the urging force of the compression coil spring 86.

On the other hand, when the leg portions 92 are pushed upward against the urging force of the compression coil spring 86, the release pad 90 pushes up the braking member 74 which the release pad 90 is abutting at the sliding-contact projecting portion 94 thereof. The meshing of the braking gear 74A and the gear teeth 72A of the anchor projections 72 is released (the braking member 74 is moved to the released position).

Figure 8:
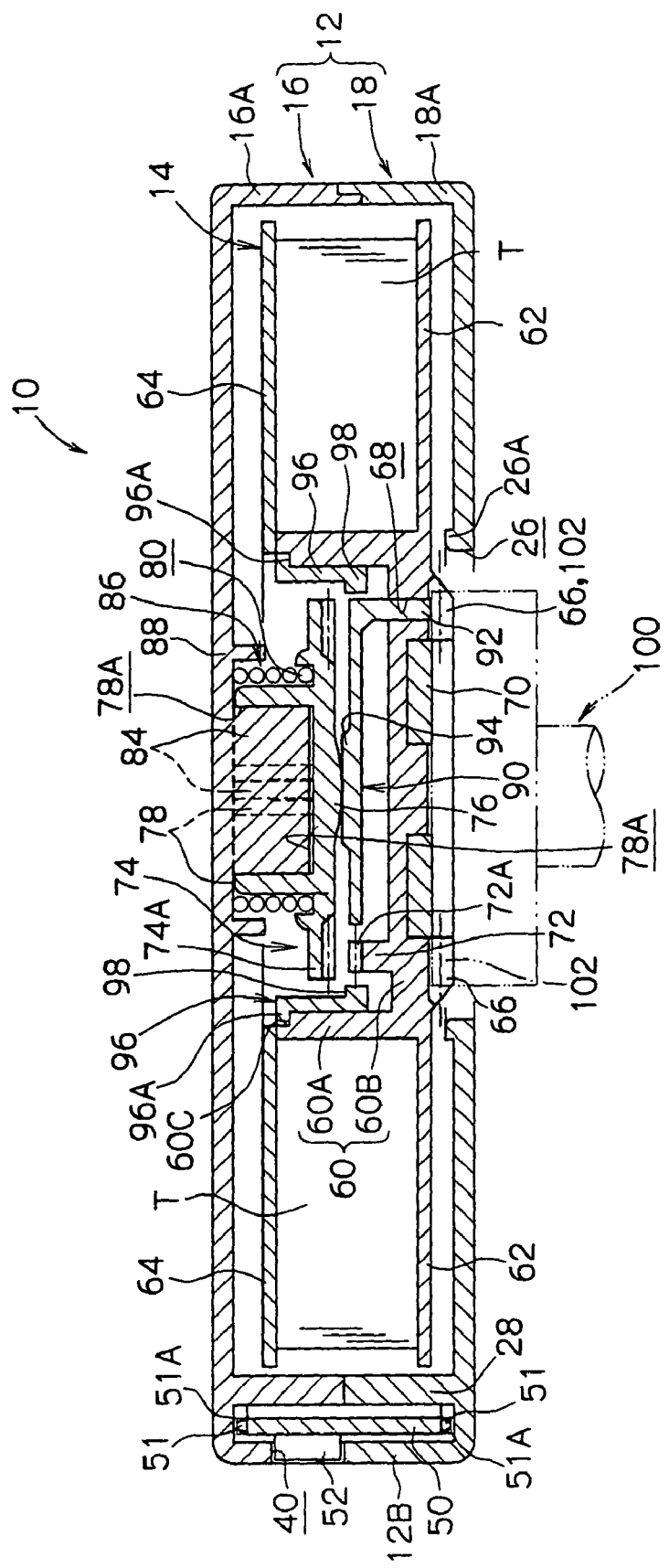
FIG. 8 is a cross-sectional view showing a rotatable state of the reel in the recording tape cartridge relating to the embodiment of the present invention.

Specifically, as shown in FIG. 8, when the driving gear 102 meshes with the reel gear 66 of the reel 14, due to the rotating shaft 100 moving upward relative to the case 12, the leg portions 92 of the release pad 90 are pushed by the addenda of the driving gear 102. In this way, accompanying the meshing of the driving gear 102 with the reel gear 66, the reel 14 floats up within the case 12 against the urging force of the compression coil spring 86 (the lower flange 62 is moved away from the annular rib 26A), and the state in which rotation is impeded by the braking member 74 is released such that the reel 14 becomes able to rotate within the case 12.

Note that, in this state, the leg portions 92 of the release pad 90 are positioned within the through holes 68 of the reel hub 60, and when the rotating shaft 100 rotates, the release pad 90 rotates together with the reel 14. Thus, at the time when the reel 14 is rotating, the braking member 74 and the release pad 90 rotate relative to one another and slidingly contact one another at the sliding-contact projecting portions 76, 94 thereof which are the regions thereof which abut one another.

Next, the reinforcing ring 96 which is fit in the reel hub 60 will be described. The reinforcing ring 96 is formed in the shape of a short, hollow cylinder which is slightly shorter than the tubular portion 60A of the reel hub 60. An annular flange portion 96A extends outwardly in the radial direction from the top end portion of the reinforcing ring 96. The reinforcing ring 96 is fixed to the reel hub 60 in a state in which the reinforcing ring 96 is inserted in the tubular portion 60A and the flange portion 96A engages with a step portion 60C formed at the top end surface of the tubular portion 60A.

The reinforcing ring 96 is formed of, for example, a metal material or a resin material or the like. When the reinforcing ring 96 is formed of a metal material, it is preferably a non-magnetic material such as an aluminum material (an aluminum alloy) or the like, in consideration of the fact that the magnetic tape T is being used as the recording tape. When the reinforcing ring 96 is formed of a resin material, it is preferably a material having a thermal contraction rate (a coefficient of linear expansion) which is about the same as that of the resin material forming the reel hub 60. The reinforcing ring 96 which is made of a metal material is fixed to the reel hub 60 by insert molding or press-fitting or the like. The reinforcing ring 96 which is formed of a resin material is fixed to the reel hub 60 by caulking (thermal caulking), welding, press-fitting, or the like.

The top end portion of the reel hub 60, which top end is open, is reinforced by the reinforcing ring 96. Owing to this reinforcement, the strength of the reel hub 60 in the radial direction in particular is improved, and the reel hub 60 can sufficiently resist the pressure of winding of the magnetic tape T.

A restricting ring portion 98 serving as an "annular portion" extends inwardly in the radial direction from the bottom end portion of the reinforcing ring 96. The restricting ring portion 98 is formed in the shape of a ring whose inner diameter is slightly larger than the outer diameter of the braking member 74. As shown in FIGS. 7 and 10A, the restricting ring portion 98 is disposed such that the inner peripheral surface thereof opposes the outer peripheral surface of the braking member 74, in the state in which the braking gear 74A of the braking member 74 meshes with the gear teeth 72A of the reel hub 60 (i.e., the state in which the braking member 74 is positioned at the rotation locked position).

On the other hand, as shown in FIGS. 8 and 10C, in the state in which the reel gear 66 and the driving gear 102 are completely meshed together and the meshed state of the braking gear 74A and the gear teeth 72A is cancelled (i.e., in the state in which the braking member 74 is positioned at the released position), the inner peripheral surface of the restricting ring portion 98 does not oppose the outer peripheral surface of the braking member 74.

Namely, an amount L1, along the axial direction, over which engagement of the braking member 74 and the restricting ring portion 98 is possible at the time when the braking member 74 is positioned at the rotation locked position (i.e., the amount of overlapping), is smaller than a stroke L2 of movement, along the axial direction, of the braking member 74 from the rotation locked position to the released position. Note that FIG. 10B illustrates a state in which the braking member 74 is moving from the rotation locked position to the released position (or vice-versa).

An opposing interval C, over which the inner peripheral surface of the restricting ring portion 98 and the outer peripheral surface of the braking member 74 positioned at the rotation locked position oppose one another (i.e., a clearance at one side in the radial direction), is, in a case in which the braking member 74 and the annular ring portion 98 are disposed coaxially, preferably set to be 0.1 mm to 9 mm, and in the present embodiment, is more preferably set to 0.1 mm to 0.3 mm. In this way, radial direction movement of the reel 14 with respect to the case 12 is restricted via the braking member 74. Note that the opposing interval C is sufficiently smaller than the interval between the play restricting walls 28 and the outer peripheral portions of the upper and lower flanges 62, 64 of the reel 14.

In the recording tape cartridge 10, tilting and radial direction movement of the braking member 74 itself with respect to the case 12 are suppressed in order to reliably suppress radial direction movement of the reel 14. Specifically, the amount of insertion of the cross-shaped rib 84 into the insertion groove 78A of the braking member 74, which is positioned at the rotation locked position, is preferably 20% or more of the depth of the insertion groove 78A, and 50% or more is particularly preferable. In the present embodiment, this amount of insertion is substantially 50%. Moreover, the clearance between the cross-shaped rib 84 and the inner surface of the cross-shaped projection 78, which is the groove walls of the insertion groove 78A, is preferably 0.2 mm or less. In the present embodiment, this clearance is 0.1 mm at each of the both sides of the cross-shaped rib 84 in the direction of plate thickness thereof. In this way, even at the rotation locked position where the amount of insertion of the cross-shaped rib 84 into the insertion groove 78A is small, tilting and radial direction movement of the braking member 74 with respect to the case 12 can be markedly suppressed.

Next, operation of the present embodiment will be described.

When the recording tape cartridge 10 having the above-described structure is not being used (e.g., is being stored or transported or the like), the door 50, whose distal end portion has entered into the concave portions 30A due to the urging force of the coil spring 56, closes the opening 20.

Further, as shown in FIG. 7, at the reel 14, the reel gear 66 is exposed from the gear opening 26 while the lower flange 62 is being pushed against (is being made to abut) the annular rib 26A due to the urging force of the compression coil spring 86 which is transmitted via the braking member 74 which meshes with the anchor projections 72 (and via the release pad 90).

Due to the urging force of the compression coil spring 86, the braking gear 74A of the braking member 74 meshes with the gear teeth 72A of the anchor projections 72, and rotation of the reel 14 with respect to the case 12 is impeded. Namely, the braking member 74 is positioned at the rotation locked position. Moreover, radial direction movement of the reel 14 with respect to the case 12 is restricted due to the restricting ring portion 98 of the reinforcing ring 96, which is fit- together with the reel hub 60, opposing the outer peripheral surface of the braking member 74 which is positioned at the rotation locked position.

On the other hand, when the magnetic tape T is to be used, the recording tape cartridge 10 is loaded into a bucket (not illustrated) of a drive device along the direction of arrow A. Accompanying this loading, the engaging projecting portion 104, which is fixed to the bucket, engages with the operation projection 52 of the door 50. The door 50 thereby rotates substantially rearward and opens the opening 20.

Then, when the recording tape cartridge 10 is loaded to a predetermined depth in the bucket, the bucket is lowered. The rotating shaft 100 of the drive device relatively approaches the gear opening 26 of the case 12 (i.e., relatively moves upward), and holds the reel 14. Specifically, the driving gear 102 meshes with the reel gear 66 while the reel plate 70 is attracted and held by the magnet (not illustrated) disposed at the distal end portion of the rotating shaft 100.

Accompanying this meshing of the reel gear 66 and the driving gear 102, the addenda of the driving gear 102 abut the distal ends (lower end surfaces) of the leg portions 92 of the release pad 90, and push the release pad 90 upward against the urging force of the compression coil spring 86. In this way, the braking member 74, which is abutting the release pad 90 at the sliding-contact projecting portion 76, is also moved upward. The meshing of the braking gear 74A of the braking member 74 and the gear teeth 72A of the anchor projections 72 is released.

When the rotating shaft 100 moves further upward, the reel 14 is, against the urging force of the compression coil spring 86, raised upward together with the release pad 90 and the braking member 74 (with the relative positions thereof remaining unchanged), and the lower flange 62 moves apart from the annular rib 26A. In this way, the reel 14 floats up within the case 12, and becomes able to rotate in a state in which it does not contact the inner surfaces of the case 12.

Further, due to the bucket being lowered, the recording tape cartridge 10 is positioned within the drive device. In this state, the pull-out means of the drive device pulls the leader pin 22 out from the opening 20 which has been opened, and accommodates the leader pin 22 at a take-up reel of the drive device. When the drive device drives and rotates the take-up reel and the reel 14 (the rotating shaft 100) synchronously, the magnetic tape T is successively pulled-out from the case 12 while being taken-up onto the take-up reel. Information is recorded or played-back by a recording/playback head or the like disposed along a predetermined tape path.

At this time, the sliding-contact projecting portion 76 of the braking member 74, which cannot rotate with respect to the case 12, slidingly contacts the sliding-contact projecting portion 94 of the release pad 90 which, together with the reel 14, rotates with respect to the case 12.

On the other hand, when the magnetic tape T is rewound onto the reel 14 and the leader pin 22 is held at the pin stands 24, the magnetic force of the magnet is cancelled, the attraction between the rotating shaft 100 and the reel plate 70 is cancelled, and the bucket, in which the recording tape cartridge 10 is loaded, is raised.

Thus, the meshing of the reel gear 66 and the driving gear 102 is cancelled, and the abutment of the driving gear 102 and the leg portions 92 of the release pad 90 is cancelled. Due to the urging force of the compression coil spring 86, the release pad 90 moves downward together with the braking member 74 (i.e., while the state in which the release pad 90 and the braking member 74 abut one another is maintained).

In this way, the respective leg portions 92 of the release pad 90 project from the through holes 68 to the region where the reel gear 66 is formed, and the braking gear 74A of the braking member 74 meshes with the gear teeth 72A of the anchor projections 72. Namely, the braking member 74 returns to the rotation locked position at which the braking member 74 impedes rotation of the reel 14.

Moreover, accompanying the movement of the braking member 74 and the release pad 90 due to the urging force of the compression coil spring 86, the reel 14 also moves downward. The reel 14 returns to the initial state in which the reel gear 66 is exposed from the gear opening 26 while the lower flange 62 of the reel 14 abuts the annular rib 26A.

Further, when the recording tape cartridge 10 is to be ejected from the bucket, the recording tape cartridge 10 is moved in the direction opposite to the direction of arrow A by the urging force of the coil spring 56 or by an unillustrated ejecting mechanism. Accompanying this movement, the door 50 closes the opening 20 due to the urging force of the coil spring 56. In this way, the recording tape cartridge 10 is ejected from the drive device and returned to its initial state.

Here, at the recording tape cartridge 10, the reinforcing ring 96, which is fit in at the inner periphery of the tubular portion 60A of the reel hub 60, reinforces the top end opening portion of the reel hub 60. The strength, in the radial direction, at the upper end opening portion of the reel hub 60 is improved. Thus, the strength of the reel hub 60 with respect to the pressure of winding of the recording tape is sufficiently ensured.

The restricting ring portion 98 of the reinforcing ring 96 opposes the outer peripheral surface of the braking member 74 which is positioned at the rotation locked position, with there being the opposing interval C (which is a predetermined value or less) between the restricting ring portion 98 and the outer peripheral surface of the braking member 74. Therefore, radial direction movement of the reel 14 with respect to the case 12 is suppressed. In this way, even in a vertical-type drive device, there is hardly any positional offset of the reel 14 in the radial direction during the time until the reel 14 is held by a rotating driving means, and the reel 14 can be held appropriately by the rotating driving means.

In this way, in the recording tape cartridge 10 relating to the present embodiment, radial direction movement of the reel 14 with respect to the case 12 can be suppressed via the braking member 74 which impedes rotation of the reel 14 when the recording tape cartridge 10 is not being used, while the strength of the reel hub 60 with respect to the winding pressure of the magnetic tape T is ensured.

In particular, the restricting ring portion 98 extends toward the inner side in the radial direction of the reinforcing ring 96, and does not oppose the outer peripheral surface of the braking member 74 which is positioned at the released position. Thus, the opposing interval C, between the restricting ring portion 98 and the outer peripheral surface of the braking member 74 when the braking member 74 is positioned at the rotation locked position, can be set to be sufficiently small. In the present embodiment, the opposing interval C, which is the aforementioned predetermined value, is set to be within the range of 0.1 mm to 0.3 mm which is a range of particularly preferable values. The amount of radial direction movement of the reel 14 with respect to the case 12 is thereby markedly suppressed.

Moreover, the amount of insertion of the cross-shaped rib 84 of the case 12 into the insertion groove 78A of the braking member 74 positioned at the rotation locked position is substantially 50% of the depth of the insertion groove 78A (the amount of insertion is the same as or slightly larger than the stroke of movement of the braking member 74). Therefore, radial direction movement and tilting of the braking member 74 itself with respect to the case 12 is markedly suppressed, and radial direction movement of the reel 14 with respect to the case 12 is suppressed even more effectively.

The clearance between the cross-shaped rib 84 and the inner surface of the cross-shaped projection 78, which is the groove wall of the insertion groove 78A, is 0.1 mm. Thus, while smooth, axial direction movement of the braking member 74 is permitted, radial direction movement and tilting of the braking member 74 itself with respect to the case 12 are suppressed even more markedly, and radial direction movement of the reel 14 with respect to the case 12 is suppressed even more effectively.

Note that the above-described present embodiment is a preferable structure in which the reinforcing ring 96 has the restricting ring portion 98 which extends inwardly in the radial direction. However, the present invention is not limited to the same. For example, it suffices to not provide the restricting ring portion 98. Or, a structure may be used which has, instead of the restricting ring portion 98, a plurality of restricting projections which are provided along the peripheral direction so as to project from the inner peripheral surface of the reinforcing ring 96. Further, such restricting projections and the restricting ring portion 98 are not limited to structures which are provided at the bottom end portion of the reinforcing ring 96. For example, the bottom portion of the reinforcing ring 96 may extend to a position of abutting the floor portion 60B of the reel hub 60.

Further, in the above-described embodiment, the recording tape cartridge 10 is provided with the release pad 90 for releasing the state in which rotation of the reel 14 is locked by the braking member 74. However, the present invention is not limited to the same. For example, a structure is possible in which the braking member 74 is moved to the released position by the sliding-contact projecting portion 76 of the braking member 74 being directly pushed by a releasing projection of the rotating shaft 100 which enters in from a through hole formed in the axially central portion of the floor portion 60B of the reel hub 60.

Moreover, in the above-described embodiment, the recording tape cartridge 10 is a so-called one-reel recording tape cartridge in which the single reel 14 is accommodated within the case 12. However, the present invention is not limited to the same. The recording tape cartridge 10 may be, for example, a so-called two-reel recording tape cartridge which accommodates two reels 14 which are for drawing-out and for taking-up. Accordingly, the present invention is not limited by the preferable structures of the opening 20 and the door 50 and the like.

In the above-described embodiment, the magnetic tape T is used as the recording tape. However, the present invention is not limited to the same. It suffices for the recording tape to be interpreted as an information recording/playback medium which is shaped as an elongated tape and on which information can be recorded and from which recorded information can be played back. It goes without saying that the recording tape cartridge relating to the present invention can be applied to recording tapes of any recording/playback systems.

As described above, the recording tape cartridge relating to the present invention has the excellent effect that it is possible to suppress radial direction movement of a reel by a braking member which impedes rotation of the reel at the time when the recording tape cartridge is not being used, while ensuring the strength of a reel hub with respect to the pressure of winding of a recording tape therearound.

What is claimed is:

1. A recording tape cartridge comprising:
   a tape;
   a reel having a reel hub on whose outer periphery the tape is wound, the reel hub having a cylindrical recess portion;
   a case which accommodates the reel such that the reel is rotatable;
   a braking member able to move between a locking position at which the braking member prohibits rotation of the reel, and a non-locking position at which the braking member permits rotation of the reel, the braking member being provided within the cylindrical recess portion of the reel hub; and
   a reinforcing ring fit in the cylindrical recess portion of the reel hub, and being a member separate from the reel hub,
   wherein the reinforcing ring is a cylinder which is shorter than the cylindrical recess portion of the reel hub, and the reel hub and the reinforcing ring have shapes for holding the reinforcing ring at a top end portion of the reel hub.

2. The recording tape cartridge of claim 1, wherein the reinforcing ring has a tubular portion, and a restricting ring portion which is provided at one end of the tubular portion and which has an inner diameter which is smaller than an inner diameter of the tubular portion.

3. The recording tape cartridge of claim 2, wherein, at the locking position, the braking member opposes the restricting ring portion, and at the non-locking position, the braking member opposes the tubular portion.

4. The recording tape cartridge of claim 2, wherein a clearance between the braking member at the locking position and the restricting ring portion is preferably 0.1 mm to 0.9 mm, and is more preferably 0.1 mm to 0.3 mm.

5. The recording tape cartridge of claim 1, wherein the braking member is translationally movable in a direction of an axis of rotation of the reel, between the locking position and the non-locking position.

6. The recording tape cartridge of claim 1, further comprising an urging member which always urges the braking member toward the locking position.

7. The recording tape cartridge of claim 1, further comprising a release pad for forcing movement of the braking member indirectly from an exterior of the case.

8. The recording tape cartridge of claim 1, further comprising a mechanism which prohibits relative rotation of the case and the braking member.

9. The recording tape cartridge of claim 8, wherein the mechanism has a cross-shaped rib provided at the case, and a cross-shaped projection which is provided at the braking member and in which an insertion groove is formed.

10. The recording tape cartridge of claim 1, further comprising a tape access opening provided at the case.

11. The recording tape cartridge of claim 10, further comprising a shielding member able to move reciprocally along an arc-shaped path of movement between a closing position, at which the shielding member closes the tape access opening, and an opening position, at which the shielding member opens the tape access opening.

12. The recording tape cartridge of claim 10, wherein the case has a front wall portion facing in a cartridge insertion direction, a side wall portion substantially parallel to the cartridge insertion direction, and an inclined wall portion connecting the front wall portion and the side wall portion and inclined with respect to the cartridge insertion direction, and
    the tape access opening is provided at the inclined wall portion of the case.

13. A tape drive into which a tape cartridge is inserted so as to be freely removable therefrom, and which carries out at least one of reading of data and writing of data, the tape cartridge having: a tape; a reel having a reel hub on whose outer periphery the tape is wound, the reel hub having a cylindrical recess portion; a case which accommodates the reel such that the reel is rotatable; a braking member able to move between a locking position at which the braking member prohibits rotation of the reel, and a non-locking position at which the braking member permits rotation of the reel, the braking member being provided within the cylindrical recess portion of the reel hub; and a reinforcing ring fit in the cylindrical recess portion of the reel hub, and being a member separate from the reel hub,
    the tape drive comprising a driving member for one of directly and indirectly forcing movement of the braking member at a time when the tape cartridge is inserted,
    wherein the reinforcing ring is a cylinder which is shorter than the cylindrical recess portion of the reel hub, and the reel hub and the reinforcing ring have shapes for holding the reinforcing ring at a top end portion of the reel hub.

14. The recording tape cartridge of claim 13, wherein the driving member can move reciprocally in a direction of an axis of rotation of the reel, for the movement of the braking member.

15. The recording tape cartridge of claim 13, wherein the driving member can drive and rotate the reel by engaging with the reel.

* * * * *